No. 719,066. PATENTED JAN. 27, 1903.
F. L. O. WADSWORTH.
ILLUMINATING STRUCTURE.
APPLICATION FILED OCT. 28, 1898.
NO MODEL. 3 SHEETS—SHEET 1.
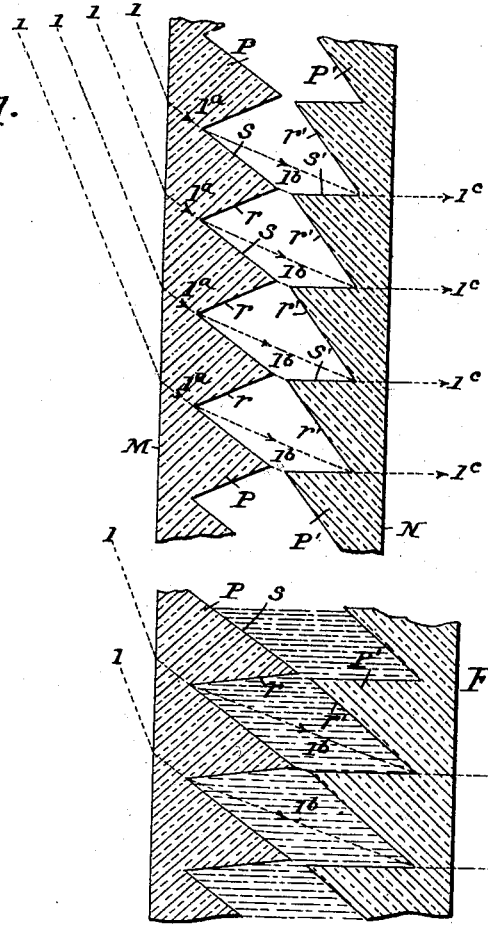
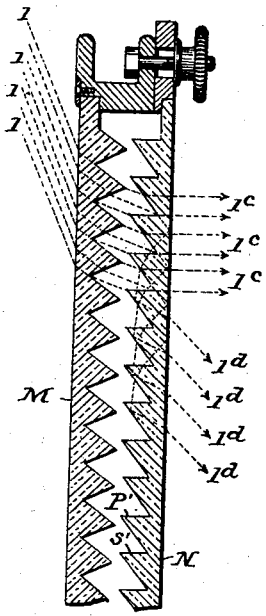
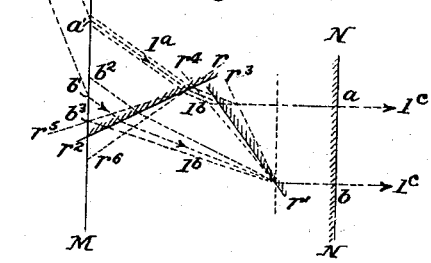

No. 719,066.  
F. L. O. WADSWORTH.  
ILLUMINATING STRUCTURE.  
APPLICATION FILED OCT. 28, 1898.  
PATENTED JAN. 27, 1903.
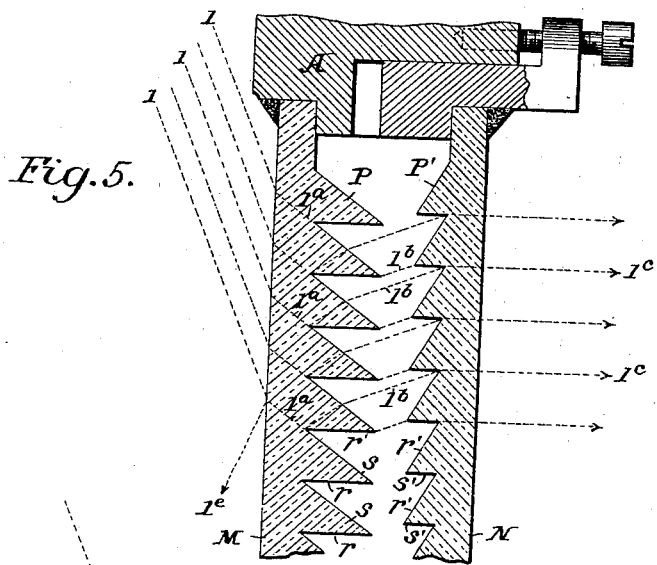
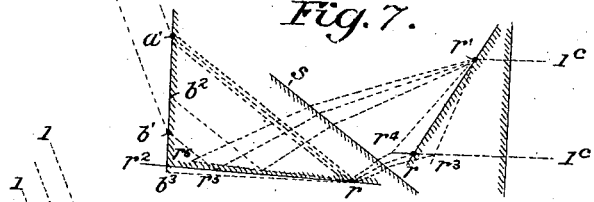
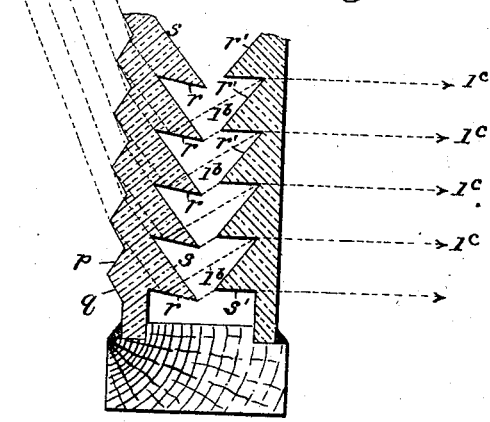

No. 719,066. PATENTED JAN. 27, 1903.
F. L. O. WADSWORTH.
ILLUMINATING STRUCTURE.
APPLICATION FILED OCT. 28, 1898.
NO MODEL. 3 SHEETS—SHEET 3.
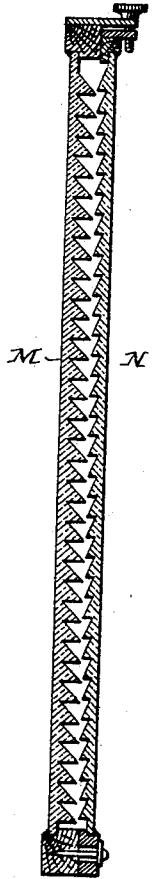
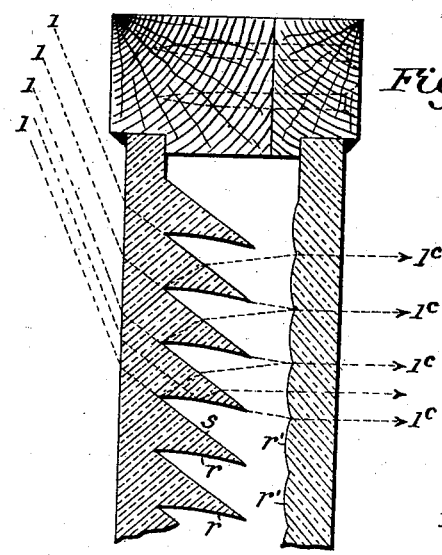
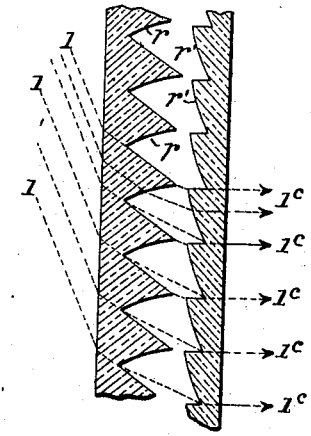
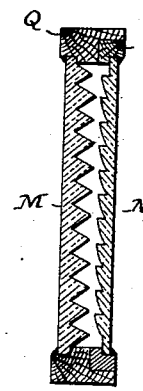
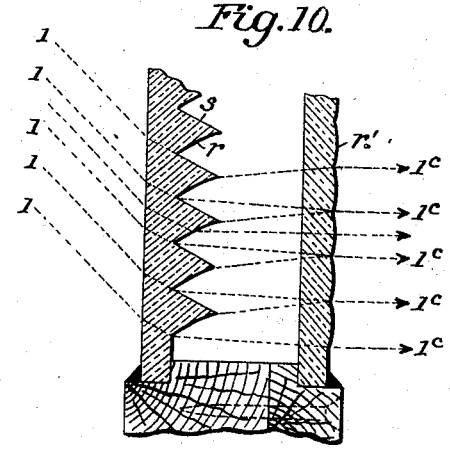
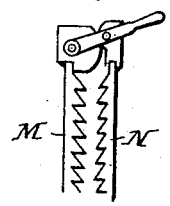
WITNESSES
INVENTOR
F. L. O. Wadsworth
by Foster Freeman
attorneys.

UNITED STATES PATENT OFFICE.

FRANK L. O. WADSWORTH, OF WILLIAMS BAY, WISCONSIN, ASSIGNOR TO PRESSED PRISM PLATE GLASS COMPANY, A CORPORATION OF WEST VIRGINIA.

ILLUMINATING STRUCTURE.

SPECIFICATION forming part of Letters Patent No. 719,066, dated January 27, 1903.

Application filed October 28, 1898. Serial No. 694,828. (No model.)

*To all whom it may concern:*

Be it known that I, FRANK L. O. WADSWORTH, a citizen of the United States, residing at Williams Bay, in the county of Walworth and State of Wisconsin, have invented certain new and useful Improvements in Illuminating Structures, of which the following is a specification.

The object of my invention is to obviate certain difficulties incident to the use of ordinary illuminating structures; and my invention consists in constructing such structures of contiguous illuminating-plates which may in some cases be relatively adjustable, as fully set forth hereinafter and as illustrated in the accompanying drawings, in which—

Figures 1 to 3 are sectional views of refracting-illuminators of different forms and adjustments embodying my invention; Fig. 4, a diagram illustrating a method of laying off the angles of the coacting prisms, Figs. 1, 2, 3; Figs. 5 to 6, sectional views of structures having reflecting-prisms embodying my invention; Fig. 7, a diagram illustrating a method of laying off the angles of structures such as those shown in Figs. 5 and 6; Figs. 8 to 12, sectional views illustrating different constructions and arrangements of parts in my improved structure. Fig. 13 is a sectional view of a panel complete embodying my improvement.

An ordinary prismatic structure acting by refraction and receiving rays from any given direction in a continuous sheet discharges them from the inner side in a series of bundles, so that when the light all comes from practically one direction the space behind the structure is irregularly illuminated. Moreover, only a certain deviation, not much exceeding sixty degrees with ordinary kinds of glass, can be secured with one set of refracting-prisms, and this only by making the angles of incidence on the prism-faces so large that there is great loss by reflection at these faces. These difficulties are both avoided by using two sets of coacting illuminating-plates with prismatic faces, as in Figs. 1 to 3. Here the rays from the principal direction 1 1 1 are deflected by the first set of prisms P P in the direction $1^b$ $1^b$ and fall upon the second set of prisms P' P', by which they are further deviated and emerge from the structure in the required direction $1^c$ $1^c$. By properly proportioning the two sets of prisms and placing them in proper position with reference to each other the whole bundle of rays deflected by the first set of refracting-surfaces $r\ r\ r$ will fall upon the second set $r'\ r'\ r'$, and be deflected thereby, so as to emerge from the inner side of the structure in an unbroken sheet, as at $1^c\ 1^c\ 1^c$. Fig. 4 is a diagram showing how the faces $r\ r'$ and $r\ r^2$ are proportioned to each other to secure this result. The proper relation may be determined mathematically or graphically by trial, as follows: Let 1 1 be the direction of the principal rays falling on the first side M M of the structure. Trace out the direction $1^a$ which these rays take in entering the structure, using to do this the relation $\sin. I = n \sin. R$, where I is the angle of incidence of the principal rays on the surface M M, $n$ the index of refraction of the glass, and R the desired angle of refraction of the rays entering the surface M M. Lay off also the direction $1^c\ 1^c$ in which it is desired that these rays shall emerge from the inner surface N N and trace these rays back through this surface in similar manner. When the rays $1^c\ 1^c$ emerge practically perpendicular to the surface N N, as in the figure, they of course enter the same without change of direction by refraction. Take any two points $a\ b$ on this surface, lay off by trial a line $r'\ r^3$, representing a refracting-surface, and trace the rays $a-1^c$, $b-1^c$ back through this surface. Lay off a second surface $r\ r^5$, inclined at such an angle that the rays just traced back through $r'\ r^3$ and taking the direction $1^b$ will enter this surface in the direction parallel to $1^a$ and find where these rays intersect the front surface M M. If the points of intersection $a'\ b^3$ are farther apart than the points $a\ b$, make a trial of two other surfaces $r'\ r^4\ r\ r^6$, which fulfil the same condition—*i. e.*, that the rays transmitted from the first enter the second parallel to $1^a$. If the points of intersection $a\ b^2$ are now closer together than the points $a\ b$, I know that the two proper coacting surfaces lie between $r'\ r^3$ and $r'\ r^4$ and $r\ r^5$ and $r\ r^6$, and a third trial usually suffices to determine the two proper surfaces $r\ r'$ and $r\ r^2$, which will coact in such a way that the two rays $1^c\ 1^c$ emerge from the rear face at the same distance apart $a\ b$ as the distance apart at which they entered. Having thus determined the proper angles which the deflecting-faces $r\ r'$ make with the two surfaces M M and N N, respectively, we lay off the other neutral surfaces $s$ and $s'$ of the prisms respectively parallel to the directions $1^a$ and $1^c$, which the principal rays take in the two plates. If then we make the prisms on the two plates of the same width (measured along the planes of their respective plates) and place the second plate so that the meeting edges of the prismatic faces are on lines parallel to the direction $1^b$ of the rays between the plates, as in Fig. 1, the continuous sheet of light falling on the front surface from the direction 1 1 1 will be transmitted through the structure and emerge from the inner side as an unbroken sheet—i. e., the entire space behind N N will be uniformly illuminated in the direction $1^c\ 1^c$.

Prismatic reflecting structures as usually constructed are open to the same objection that has just been pointed out in connection with prismatic structures acting by refraction.

In the operation of prismatic reflecting structures of ordinary form the sheet of light falling on the front surface is broken up by the prisms, so as to emerge as series of separate bundles. In structures heretofore proposed this defect is overcome to a certain degree by the use of dispersing ribs or grooves on the inner emergent surface, which break up these separated bundles into spreading cones of light; but this construction has other disadvantages which need not here be enumerated.

Figs. 5, 6, 7 illustrate the application of my invention to overcome this difficulty incident to reflecting-prisms. As before, I make use of two illuminating-plates M N, the prisms P on the front plate being reflecting-prisms and the prisms of both plates projecting into the intermediate chamber. The proper inclination of the coacting front reflecting-faces $r$ and the rear refracting-faces $r'$ is determined mathematically or graphically, as before, as shown in Fig. 7, in which like letters of reference relate to the same trial surfaces and operations as have already been described in connection with Fig. 4.

Figs. 8 and 10 illustrate a modification in which a continuous sheet of light from the inner side of the structure is secured by the use on the first plate of prisms having concave deflecting-faces $r$, coacting with convexly-curved lenses or ribs $r'$ on the second plate. The first concave deflecting-faces act to diverge or spread as well as deflect the streams of light falling upon them, so that the latter will completely cover the receiving-surface of the second plate. In order to obtain a continuous parallel sheet of rays from the latter, it is then only necessary to provide this surface with a series of convexly-curved lenses or ribs, so situated that the edges of the ribs are on the lines of intersection of the extreme rays from contiguous prism elements, as shown in Figs. 8 and 10, and of such curvature that the divergent streams of light will be rendered parallel. The first deflecting-faces may be either reflecting-faces, as in Fig. 8, or refracting-faces, as in Fig. 10. In the latter case, as already stated, only rays having a certain maximum inclination to the horizontal (not generally exceeding about sixty degrees) can be efficiently directed into the space to be illuminated in a horizontal direction. An additional deflection at the curved ribs may be secured by making these prismatic in form, as in Fig. 9, in which case there is obtained a combination of the effects shown in Figs. 1 and 2 and in Fig. 10.

In some cases I may fill the chambers between the plates with liquid, as in Fig. 2. The angles of the prisms are then different, because of the difference in refraction between air and the liquid used, but the principles governing the design are the same as already set forth.

In the building up of the illuminating structure two illuminating-plates of the character described are mounted in the frame with a chamber between, and preferably the deflecting elements project inwardly into the chamber. This protects these elements from accidental breaking, also from becoming dirty, and permits the external light receiving and discharging faces to be substantially flat and smooth, so they may be readily cleaned. In some cases there may be series of flat receiving-ribs on the outer side, as in Fig. 6, the upper sides $p$ nearly perpendicular to the incident rays of light and the lower faces $q$ nearly parallel thereto. These ribs act simply to diminish the loss of light by reflection at the front surface, as at $1^e$, Fig. 5, and are not properly deflecting elements. In other cases the curved ribs $r'\ r'$ may be turned outward toward the rear surface, as in Fig. 10. In either case the projecting portions are so low that they do not interfere with ready cleaning of the sheet. The sheets may be placed so that the inwardly-projecting portions are practically in contact or separated to a moderate extent or widely separated, as at Fig. 10. In any case the inclosed chamber or space between the plates (which is closed on two sides by the glass sheets, on the others by the supporting-frame A) acts as an air-curtain, (which, as already stated, may be of any desired thickness,) protecting the room from sudden change of temperature. The structure acts in this respect like a storm-sash. Both sheets of glass may in certain cases be secured in a common frame, as in Fig. 6; but as the interior space may occasionally become dusty and dirty, no matter how great care is taken in sealing the plates into the frame, I prefer to mount each plate of illuminating-glass, however constructed, in its own frame and to secure these frames together face to face, as shown in Figs. 3, 8, 10, 11, and 13. These frames can then be readily disconnected when desired and the internal inclosed faces cleaned without even removing the main frame of the structure from position. The introduction of dirt and dust may be prevented by filling the cavity with liquid, as in Fig. 2; but in this case also it is desirable to have the plates separable, so that liquid may be replaced or removed when desired. The frames may be secured together by screws or other suitable means in permanent relation, as illustrated in Figs. 8 and 10, or they may be made adjustable longitudinally, as in Figs. 2 and 13, or laterally or transversely, as in Fig. 5. In either case it is practicable by such adjustment to alter the form or outline of the internal chamber. By this means we are enabled to alter the direction of the emergent rays or to vary the amount of light sent in the desired direction. Thus by moving the rear prismatic plate (shown in Fig. 1) from the position shown in that figure to that shown in Fig. 3 some of the rays will fall upon the neutral surfaces $s'$ $s'$ of the prisms P' and be in consequence sent downward in the direction $1^d$ $1^d$ instead of backward in the initial direction $1^c$ $1^c$. The same result may be accomplished by moving the rear plate away from or toward the front plate, as provided in Fig. 5. In this case the rays which then fall on the neutral surfaces $s'$ $s'$ will be deflected upward toward the ceiling. It is possible also in certain cases to control the direction and intensity of the emergent light by mounting the plates M N in frames Q Q', Fig. 15, intended to be circular and rotating one plate with reference to the other so that the prisms are no longer parallel. This method of control has the advantage of varying the light emerging from different portions of the rear plate in different degrees. In other cases we may move one plate laterally as well as transversely with reference to the other one, as by the pivoted lever arrangement shown in Fig. 12. In general there will be a variation in the quantity of light sent in any given direction whenever one plate moves with reference to the other along any line not parallel to the direction $1^b$ in which the light emerges from the rear surface of the front plate. This ability to control quantity of illumination in an apartment is a valuable one where the intensity of the light changes during the day.

I do not here claim the use of coacting concave and convex deflecting-faces, as this forms the subject of my application Serial No. 694,830.

Without limiting myself to the precise construction and arrangement of parts shown, I claim as my invention—

1. An illuminating structure consisting of two opposing light-deflecting prismatic plates having light-receiving and emergent faces and an intermediate chamber, and means for shifting the plates to alter the cross-sectional outline of said chamber, substantially as set forth.

2. An illuminating structure provided with parallel prismatic illuminating-plates, one adjustable in respect to the other to vary the quantity or direction of emergence of the light-rays and means for shifting the plates to any required extent, substantially as set forth.

3. The combination in an illuminating structure of a supporting-frame and two illuminating light-deflecting plates arranged in said frame to form a continuous closed intervening chamber the figured faces of both plates within said chamber, substantially as described.

In testimony whereof I have signed my name to this specification in the presence of two subscribing witnesses.

FRANK L. O. WADSWORTH.

Witnesses:
E. G. FERGUSON,
H. E. CARMACK.